N. T. & T. PORTER.
SEWING THIMBLE.
No. 190,897. Patented May 15, 1877.
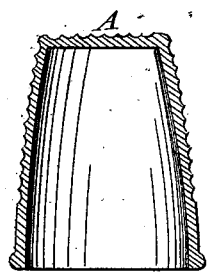
Fig: 1.
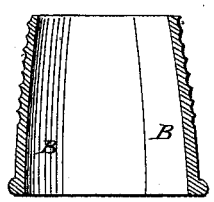
Fig: 2.
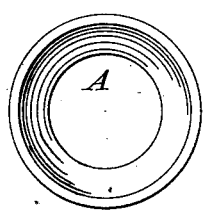
Fig: 3.
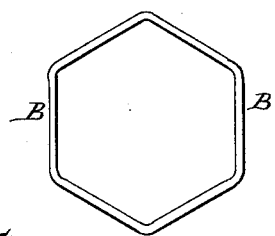
Fig: 4.
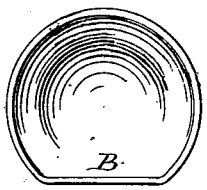
Fig: 5.
Witnesses:
Chas. Nida
H. L. Wattenberg
Inventors:
Nathan T. Porter
Thomas Porter

UNITED STATES PATENT OFFICE.

NATHAN T. PORTER AND THOMAS PORTER, OF NEW YORK, N. Y.

IMPROVEMENT IN SEWING-THIMBLES.

Specification forming part of Letters Patent No. 190,897, dated May 15, 1877; application filed April 10, 1877.

*To all whom it may concern:*

Be it known that we, NATHAN T. PORTER and THOMAS PORTER, of the city, county, and State of New York, have invented a new and useful Improvement in Thimbles; and that the following is a full, clear, and exact description of the same, reference being had to the accompanying drawings, and to the letters of reference marked thereon, making part of this specification.

This invention is in the nature of an improvement in thimbles; and the invention consists in a thimble with a top parallel with the base of the thimble or flat, and a thimble with one or more flat indented sides, the flattened surface extending the entire height of the thimble, and being integral therewith.

In the accompanying sheet of drawings, Figure 1 is a longitudinal section of our thimble with flat top; Fig. 2, a section of our thimble without top, and with flat indented sides; Fig. 3, a bottom view of our thimble with flat top and cylindrical sides; Fig. 4, a view of base of our thimble with six flat indented sides; and Fig. 5, a bottom view of our thimble with flat top and one indented side.

Similar letters of reference indicate like parts in the several figures.

Thimbles have heretofore been made with convex tops, concave tops, and, in fact, without tops of any kind, and of cylindrical shape.

As an improvement on these we construct our thimble with a top, A, which is flat or parallel with the base of the thimble, and form on the sides of the thimble one or more flattened indented sides, B. These flattened sides may be opposite each other, as is shown in Fig. 4, or the flattened sides may be of any desired number, forming a hexagon, octagon, nonagon, or otherwise, as desired.

The advantages to be gained by this construction are that, in whatever position the head of the needle is brought (when used in sewing) in contact with the surface of the thimble, it will strike said surface substantially at right angles, and be prevented from slipping.

Another advantage, and an important one, is that the thimble, by flattening its sides, is made to fit very nearly the natural shape of the finger end, and, therefore, it can be worn without fatigue, and without the liability of permanently deforming the end of the finger by forcing it to grow in a permanently contracted and pointed shape. Besides, the thimble, having more or less angles, it admits the air freely beneath it and around the finger, so that the end of the finger is less liable to become heated and uncomfortable while wearing it.

The thimble made with the flat top, and of the ordinary cylindrical shape, will be found to possess, measurably, decided advantages over thimbles of the ordinary construction, for the reasons before stated.

A tailor's thimble, without a top, and with one or more flat indented sides, is a modification of our thimble, with the flat top and flat sides combined, presenting many of the advantages hereinbefore named, but adapted more particularly to the use of tailors.

Having now described our invention, what we claim as new, and desire to secure by Letters Patent, is—

1. A sewing-thimble constructed with a top which is parallel with its base, and having one or more flat indented sides.

2. In a thimble with cylindrical sides, a top parallel with its base.

3. In a thimble, one or more flat indented sides extending from at or near the base of the thimble to the upper edge of the same, the flat sides being integral with the body of the thimble, substantially as and for the purpose described.

NATHAN T. PORTER.
THOMAS PORTER.

Witnesses:
H. L. WATTENBERG,
G. M. PLYMPTON.